(12) United States Patent
Shima et al.

(10) Patent No.: US 6,819,443 B1
(45) Date of Patent: Nov. 16, 2004

(54) NETWORK PRINTER

(75) Inventors: Toshihiro Shima, Nagano (JP); Tadashi Kobayashi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/412,402

(22) Filed: Oct. 5, 1999

(30) Foreign Application Priority Data

Oct. 14, 1998 (JP) .......................................... 10-291872

(51) Int. Cl.[7] ........................ G06F 15/00; G06F 15/16; G06F 17/221

(52) U.S. Cl. .................. 358/1.15; 358/1.15; 358/1.16; 709/226; 709/229; 715/526

(58) Field of Search ................................ 358/1.9–1.18; 715/526; 709/229, 226

(56) References Cited

U.S. PATENT DOCUMENTS

| | | | | |
|---|---|---|---|---|
| 5,490,237 A | * | 2/1996 | Zimmerman et al. | 358/1.16 |
| 5,680,522 A | * | 10/1997 | Kasai | 358/1.14 |
| 6,094,276 A | * | 7/2000 | Yamaguchi et al. | 358/1.15 |
| 6,128,094 A | * | 10/2000 | Smith | 358/1.15 |
| 6,599,325 B2 | * | 7/2003 | Gauthier et al. | 715/526 |

FOREIGN PATENT DOCUMENTS

| | | | | |
|---|---|---|---|---|
| JP | 9-37000 | 2/1997 | ............ | H04N/1/00 |
| JP | 9-218843 | 8/1997 | ........... | G06F/13/10 |
| JP | 9-282112 | 10/1997 | ............. | G06F/3/12 |

* cited by examiner

*Primary Examiner*—Kimberly Williams
*Assistant Examiner*—Saeid Ebrahimi
(74) *Attorney, Agent, or Firm*—Sughrue Mion, PLLC

(57) ABSTRACT

A network printer comprises a network interface to be connected to a communication network, in addition to a parallel interface to be connected to a host computer through a dedicated cable in one to one correspondence. A CPU within the printer executes an interruption processing for receiving a received by the network interface from the host computer, a communication task for removing a header from the received packet to extract print job data and storing the print job data into a print data buffer, a language task for interpreting the print job data within the print data buffer, and a print task for generating raster image on the basis of the interpretation result of the language task.

9 Claims, 5 Drawing Sheets

NETWORK PRINTER

BACKGROUND OF THE INVENTION

The present invention relates to a network printer having a function for receiving print job data from a communication network and printing the data.

FIG. 1 shows an arrangement of a related network printer.

A printer 1 normally includes a parallel interface (I/F) 11 so that the printer can be directly connected to a host computer 3, which is usually single, through a dedicated cable 7 in one to one correspondence by means of the parallel interface 11. In the case where the printer 1 is commonly used by a plurality of host computers in a company or the like, the printer 1 is coupled to a communication network 9 such as a local area network (LAN) within the company. In this case, a network interface board 5 as an optional part is additionally installed within the printer 1, whereby the communication network 9 is coupled to the printer 1 through the network interface board 5.

The network interface board 5 includes its own central processing unit (CPU) 23 which operates asynchronously with a CPU 17 of the printer 1. The CPU 23 executes the communication protocol thereby to extract print job data from a packet received through the communication network 9 to temporarily store the print job data in a dynamic random access memory (DRAM) 25 on the board 5 and thereafter to send the print job data thus stored to the printer 1. The printer 1 processes both the print job data sent from the network interface board 5 and the print job data inputted from the parallel interface 11 in the same manner (for example, a DMA (direct memory access) controller 15 writes the print job data into a DRAM 19 within the printer 1 and the CPU 17 image-develops the print job data) and prints the print job data thus processed.

As described above, the related printer requires the network interface board 5 in the case of coupling the printer to the network. However, the network interface board 5 includes the own CPU 23 and the DRAM 25, and further the CPU 23 operates at a high speed and the DRAM 25 has a large capacity in order to attain the high-performance, and so they are expensive consequentially. Thus, the network interface board is very expensive.

In the case of performing the bi-directional communications between the printer and the host computer, the complicated protocol corresponding to the bi-directional communications is required at two portions, that is a portion between the host computer 3 and the network interface board 5 and a portion between the network interface board 5 and the main body of the printer. Further, due to the presence of the network interface board 5, an amount of data to be copied between memories becomes large. As a result, the performance of the printer degrades, which results in a serious problem at the time of developing a high-speed network printer.

SUMMARY OF THE INVENTION

Accordingly, a first object of the present invention is to provide a cheaper network printer.

A second object of the present invention is to provide a network printer which does not require a network interface board.

A third object of the present invention is to provide a high-speed network printer.

In order to achieve the aforesaid objects, according to the present invention, there is provided a network printer connectable to a communication network, comprising: a central processing unit (CPU); a random access memory (RAM) utilized by the CPU; a network interface, coupled to the communication network, for receiving a packet containing print job data from a host device through the communication network; packet storage means for receiving the packet from the network interface and writing the packet into the RAM; and print image generating means for generating a raster image. The CPU includes: a communication task for extracting the print job data from the packet within the RAM and writing the extracted print job data into the RAM; and a language task for interpreting the print job data within the RAM. The print image generating means generates the raster image on a basis of a result of the interpretation of the language task.

According to such a network printer, since the CPU provided within the main body of the printer can extract the print job data from the packet received from the network, interpret the print job data and generate print image, it is not necessary to provide a network interface board having a CPU which is provided separately from the CPU of the main body of the printer. Accordingly, the printer can be made cheaper and operated with a higher speed due to the elimination of such a network interface board.

The means for writing a packet received by the network interface into the RAM may be one of interruption processings performed by the CPU, for example, or a DMA controller provided separately from the CPU.

According to a preferred embodiment, the generation of the print image is also executed by the task (print task) of the CPU. Of the communication, language and print tasks, the print task is provided with a highest priority level, the communication task is provided with a secondary priority level, and the language task is provided with a lowest priority level, wherein the CPU executes the communication, language and print tasks in a order of higher priority task. Since the print task has the highest priority level, particularly in the case of performing the print operation in an electrophotographic method, it is possible to minimize such a delay that the generation of raster image is delayed relative to the print speed of the print engine. Further, since the priority level of the communication task is set to be higher than that of the language task, the host device (host computer) can be released at an early stage, advantageously.

The print image may be generated by a dedicated hardware such as a gate array in place of the print task.

In a preferred embodiment, the network printer comprises, in addition to the network interface, a host interface coupled directly (that is, without through a network) to the host device unlike a parallel interface. The means for writing the data received by the host interface into the RAM may be the interruption processing performed by the CPU, for example, or the DMA controller.

DETAILED DESCRIPTION OF THE PREFERRED EMBODIMENTS

Figure 2:
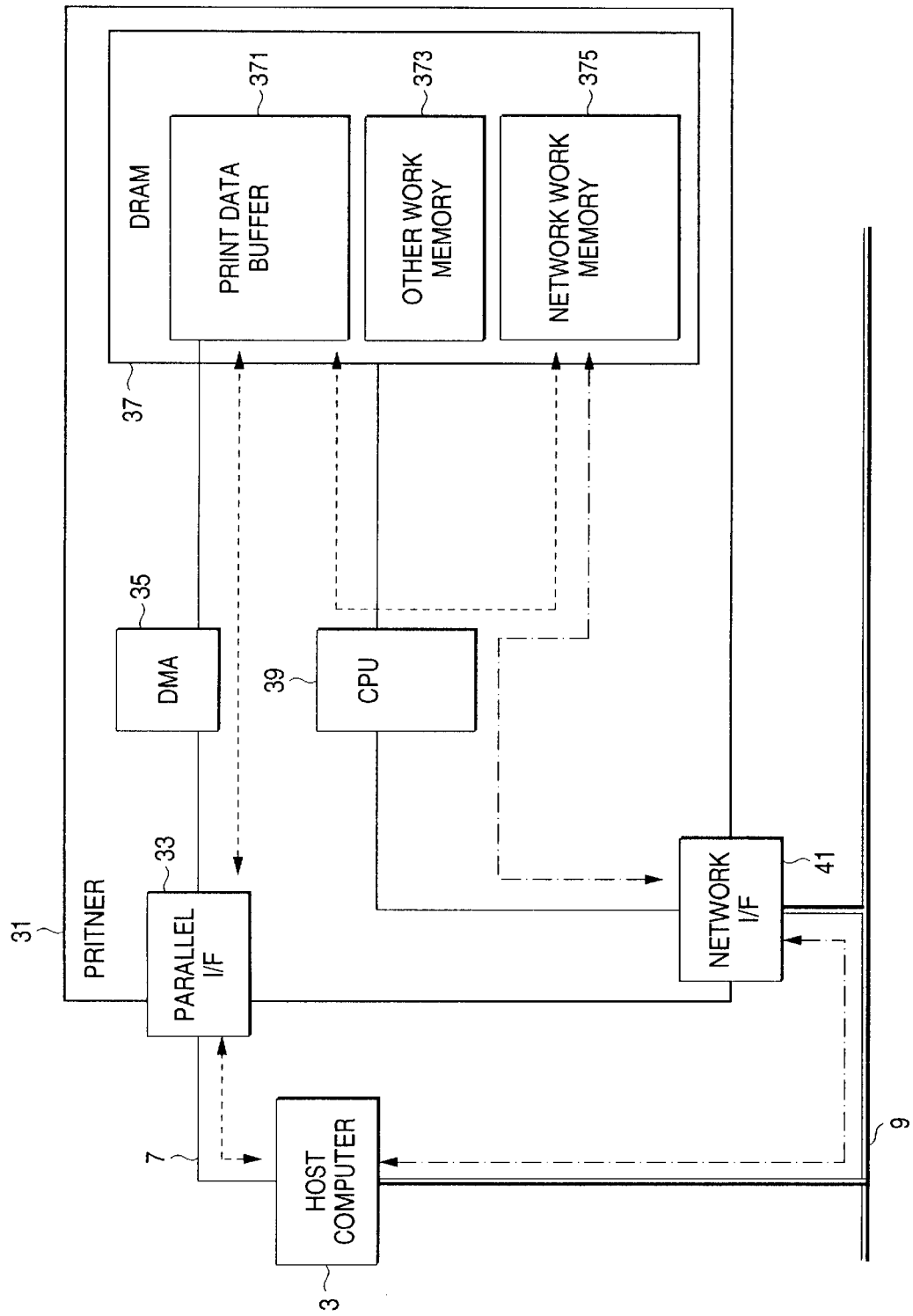
FIG. 2 is a block diagram showing an arrangement of a network printer according to a first embodiment of the present invention.

FIG. 2 shows an arrangement of a network printer according to a first embodiment of the present invention. In the figure, chain lines denote flows of packets, and dashed lines denote flows of print data.

Figure 1:
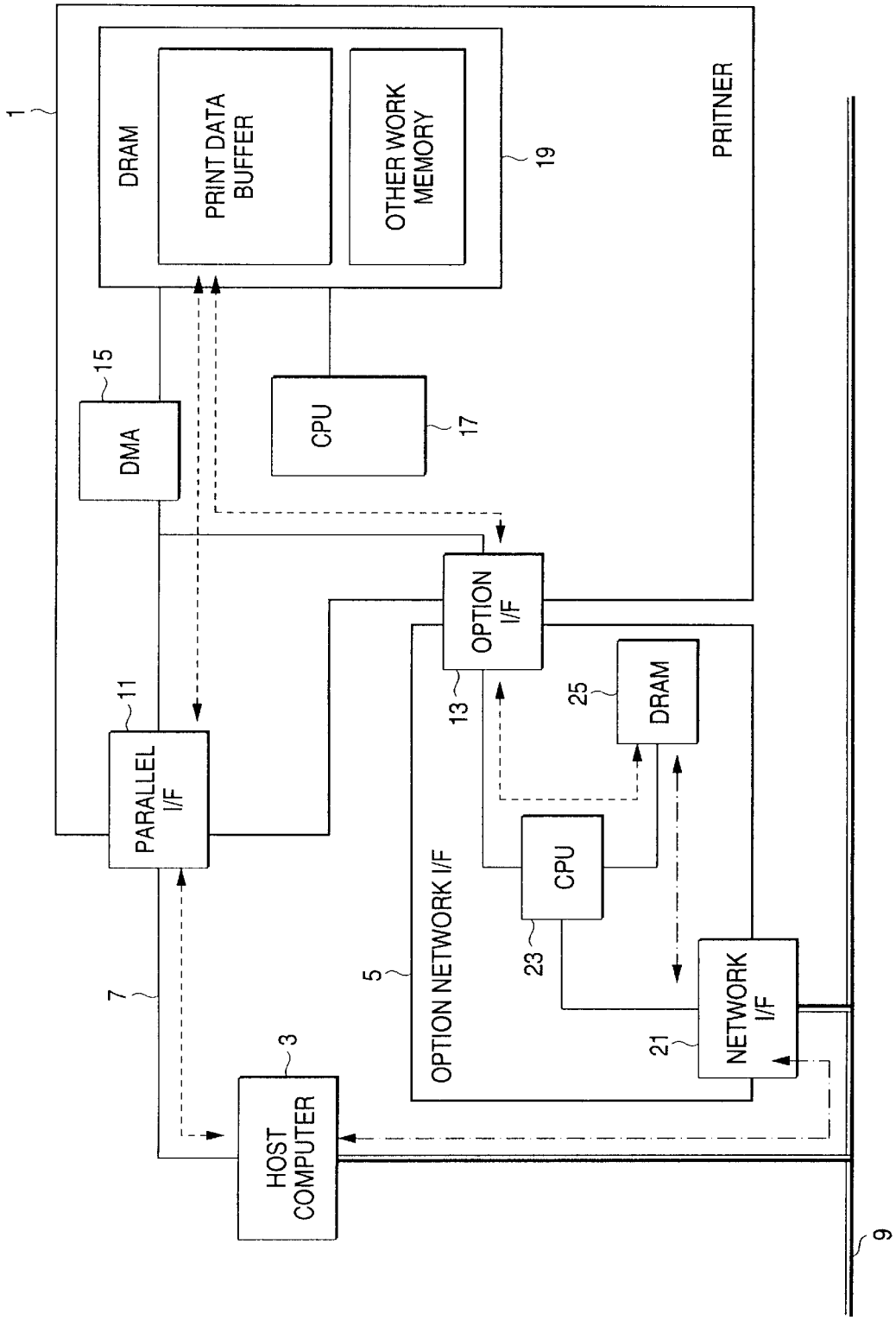
FIG. 1 is a block diagram showing an arrangement of related network printer.

A printer 31 includes a parallel interface (I/F) 33 so that the printer can be directly connected to a host computer 3 through a dedicated cable 7 in one to one correspondence by means of the parallel interface 33. The printer 31 also includes a network interface 41 so that the printer can be coupled to a communication network 9 by means of the network interface 41. The network interface 41 is substantially same as the network interface (reference numeral 21 in FIG. 1) included in the network interface board of the related printer.

The printer 31 contains a DMA controller 35, a DRAM 37 and a CPU 39. The DMA controller 35 writes the print job data received by the parallel interface 33 into a print data buffer 371 within the DRAM 37 in a direct memory access manner.

Within the DRAM 37, the print data buffer 371, a network work memory 375 and an other work memory 373 or the like are provided. The print data buffer 371 has an area for storing the print job data, in which the print job data received from the host computer is written by means of the DMA controller 35 in a manner as described above or by means of the CPU 39 in a manner as described later. The network work memory 375 has an area utilized for temporarily storing a packet received by the CPU 39 from the communication network 9 and for processing the packet, as described later. The other work memory 373 has an area used by the CPU 39 for other various uses. A print queue and an image buffer, which are not shown but described later, are also secured within the DRAM 37 by the CPU 39. The DRAM 37 may be provided in a form of a plurality of DRAM chips or a plurality of DRAM boards.

Figure 3:
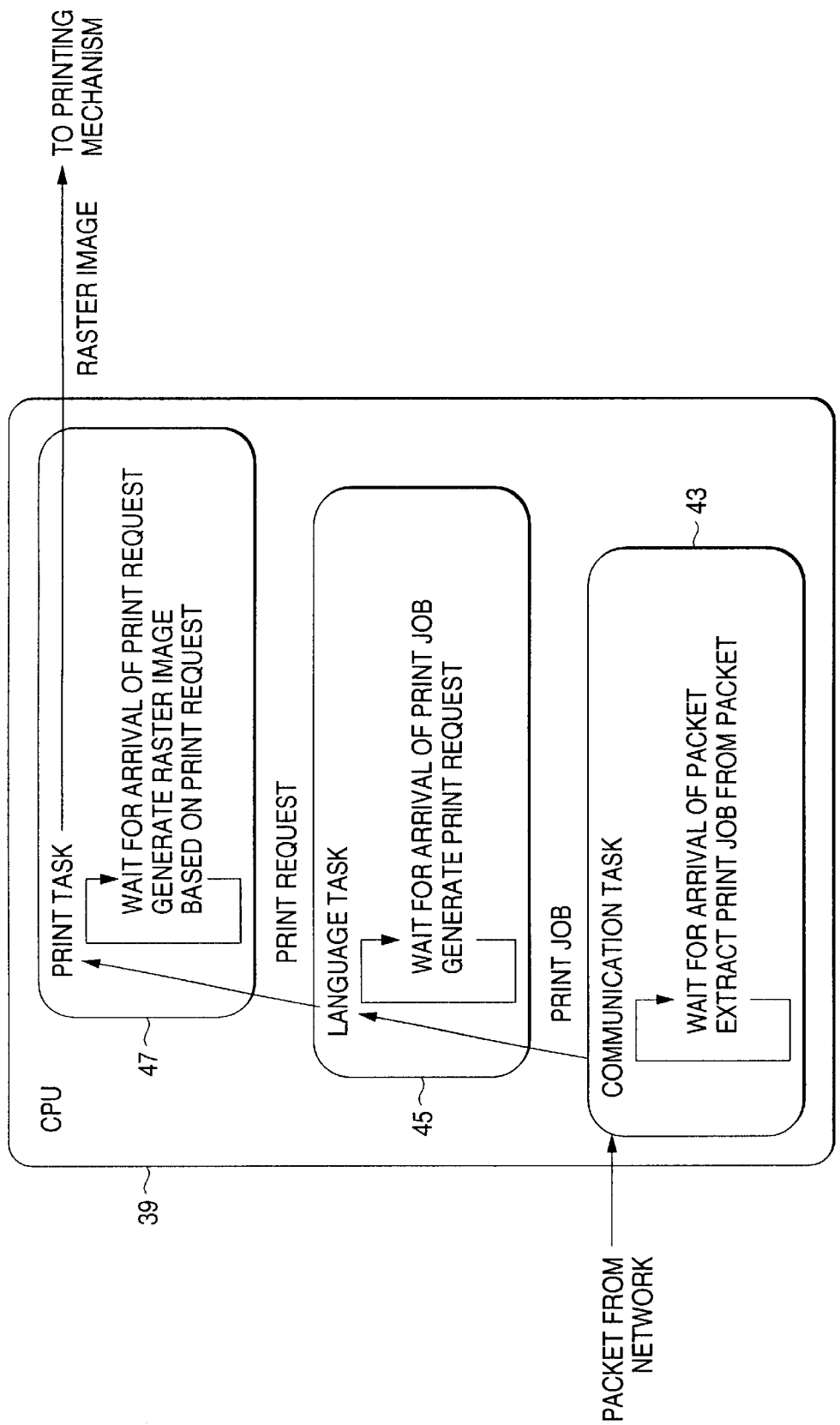
FIG. 3 is a schematic diagram showing tasks executed by a CPU.

The CPU 39 executes a plurality of predetermined tasks in a multiplexing manner. FIG. 3 shows such main tasks, that is, a communication task 43, a language task 45 and a print task 47. The communication task 43 operates to wait for a packet being written into the network work memory 375 of the DRAM 37, then, when the packet is written, to remove a header and a footer unnecessary for printing from the packet stored in the network work memory 375 thereby to extract print job data, and to write the print job data thus extracted into the print data buffer 371 of the DRAM 37. The communication task 43 continuously operates, so long as there is vacant area in the print data buffer 371 of the DRAM 37, to receive packets and extract print job data from the received packets, and to write the print job data thus extracted into the print data buffer 371. The operation for receiving a packet from the network interface 41 and storing the received packet into the network work memory 375 of the DRAM 37 is performed by the CPU 39 as an interruption processing in response to an interruption request from the network interface 41.

The language task 45 operates to wait for the print job data being written into the print data buffer 371 of the DRAM 37, then, when the print job data is written, to read and interpret the print job data thus written thereby to generate a print request on a page unit basis, and to write the print request into the print queue within the DRAM 37. The print task 47 operates to wait for the print request being written into the print queue, then, when the print request is written, to read the print request thus written from the print queue thereby to generate raster image on the basis of the print request, and to develop the raster image in the print buffer within the DRAM 37. The raster image thus developed in the print buffer is transferred to a printer mechanism (not shown in FIG. 2) and printed on a paper as an actual image.

These three tasks of the communication task 43, language task 45 and print task 47 are provided with predetermined priority levels, respectively. The CPU 39 executes the task with a higher priority level in advance. In the case of using a print engine of an electrophotographic type as the printer mechanism, the task with the highest priority level is the print task 47. This is because it is required to generate the raster image of a page to be printed so as not to delay for the print speed of the print engine while the print engine operates to transfer and print sheets. The task with the secondary priority level is the communication task 43. This is because, when the host computer 3 starts to transmit the print job data, it is desired to receive all the packets in a time period as shorter as possible thereby to release the host computer 3 from the transmission operation as early as possible. The task with the lowest priority level is the language task 45. This is because if the priority level of the language task 45 is higher than that of the communication task 43, the communication task 43 can not receive the next packet until the language task completes the interpretation of all the print job data having received. Accordingly, the language task 45 is executed to generate the print request when each of the print task 47 and the communication task 43 is in a stand-by state.

Although the language task 45 has the lowest priority level, if the language task is not executed for a long time, the printing operation also can not be performed for a long time. Thus, it is required to suitably allot the processing of the CPU 39 to the language task 45 in order to attain the high performance of the print processing. Thus, such a scheduling control for optimizing the allotment of the processing of the CPU 39 to the communication task 43, language task 45 and print task 47 is performed in a manner that the size of the print data buffer 371 is dynamically changed in accordance with the communication speed of the communication network 9 (for example, the size of the buffer is made smaller as the communication speed of the network becomes lower so as to complete the communication task 43 earlier).

Then, the operation for receiving the print job data and generating the print image under such an arrangement will be explained.

The operation from the reception of the print job data to the generation of the raster image at the time of receiving the print job data from the parallel interface 33 is performed in the order of the following processes (1) to (6).

(1) The CPU 39 sets a parameter to the DMA controller 35 so that the data from the parallel interface 33 is written into the print data buffer 371 of the DRAM 37 by an amount of a designated size.

(2) When the parallel interface 33 receives the data of a single unit size (for example, one byte) from the host computer 3, the parallel interface generates a request signal to the DMA controller 35.

(3) Then, the DMA controller 35 writes the data received by the parallel interface 33 into the print data buffer 371 of the DRAM 37.

(4) The DMA controller 35 repeats the aforesaid operations (2) and (3) until an amount of the received data written into the print data buffer becomes the designated size set in the process (1).

(5) When the DMA controller 35 completes the writing of the received data into the print data buffer by an amount of the designated size set in the process (1), the DMA controller issues an interruption request to the CPU 39.

(6) The CPU 39 reads the data within the print data buffer 371 and generates the print request on a page unit basis (the language task 45), and then converts the print request into the raster image (the print task 47).

Then, the operation from the reception of the print job data to the generation of the print image at the time of receiving the print job data from the network interface 41 is performed in the order of the following processes (1) to (4).

(1) When the network interface 41 receives a packet (data) from the host computer 3, the network interface issues an interruption request to the CPU 39.

(2) The CPU 39 reads the received packet from the network interface 41 and writes the packet thus read into the network work memory 375 (interruption processing).

(3) Then, the CPU 39 removes a header and a hooter unnecessary for printing from the packet stored in the network work memory 375 thereby to extract and copy the net print job data in the print data buffer 371 (the communication task 43).

(4) Thereafter, the CPU 39 reads the data within the print data buffer 371 and generates the print request on a page unit basis (the language task 45), and then converts the print request into the raster image (the print task 47).

Figure 4:
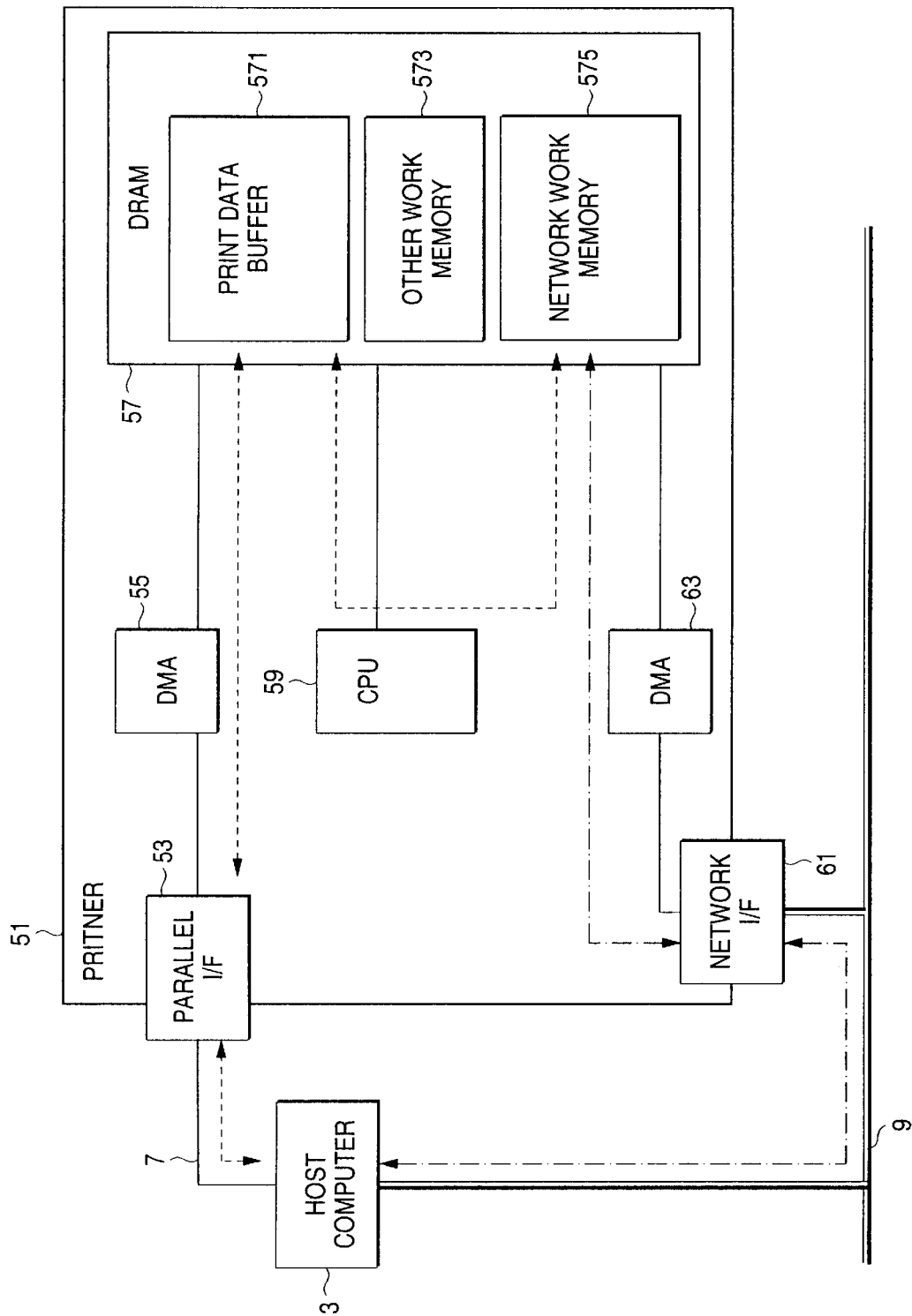
FIG. 4 is a block diagram showing an arrangement of a network printer according to a second embodiment of the present invention.

FIG. 4 shows an arrangement of the network printer according to a second embodiment of the present invention. Also in this figure, chain lines denote flows of the packets, and dashed lines denote flows of the print data.

In the first embodiment shown in FIG. 2, the received data from the parallel interface is written into the DRAM by means of the DMA controller, and the received data from the network is written into the DRAM by means of the CPU. In contrast, a network printer 51 shown in FIG. 4 is arranged in a manner that the data received from each of the parallel interface and the network is written into a DRAM by means of a DMA controller. That is, a DMA controller 63 is provided between a network interface 61 and a DRAM 57 so that the DMA controller 63 writes a packet received by the network interface 61 into a network work memory 575 within the DRAM 57 in a direct memory access manner. The arrangement of the second embodiment except for this point is substantially same as that of the first embodiment shown in FIG. 2.

Hereinafter, the operation for receiving the print job data and generating the print image under such an arrangement will be explained.

The operation from the reception of the print job data to the generation of the print image at the time of receiving the print job data from a parallel interface 53 is substantially same as that of the aforesaid first embodiment, and so the explanation thereof will be omitted. Next, the operation from the reception of the print job data to the generation of the print image at the time of receiving the print job data from the network interface 61 is performed in the order of the following processes (1) to (6).

(1) When the network interface 61 receives a packet (data) from the host computer 3, the network interface issues an interruption request to a CPU 59.

(2) The CPU 59 sets a parameter to the DMA controller 63 so that the data from the network interface 61 is written into the network work memory 575 of the DRAM 57 by an amount of the size of the packet received by the network interface 61.

(3) The DMA controller 63 writes the packet received by the network interface 61 into the network work memory 575 of the DRAM 57 by the amount of the size designated by the aforesaid process (2).

(4) When the DMA controller 63 writes the received packet into the network work memory by an amount of the designated size, the DMA controller issues an interruption request to the CPU 59.

(5) Then, the CPU 59 removes a header unnecessary for printing from the packet stored in the network work memory 575 thereby to extract and copy the net print job data in a print data buffer 571 (the communication task).

(6) Thereafter, the CPU 59 reads the data within the print data buffer 571 and generates the print request on a page unit basis (the language task), and then converts the print request into the raster image (the print task).

Figure 5:
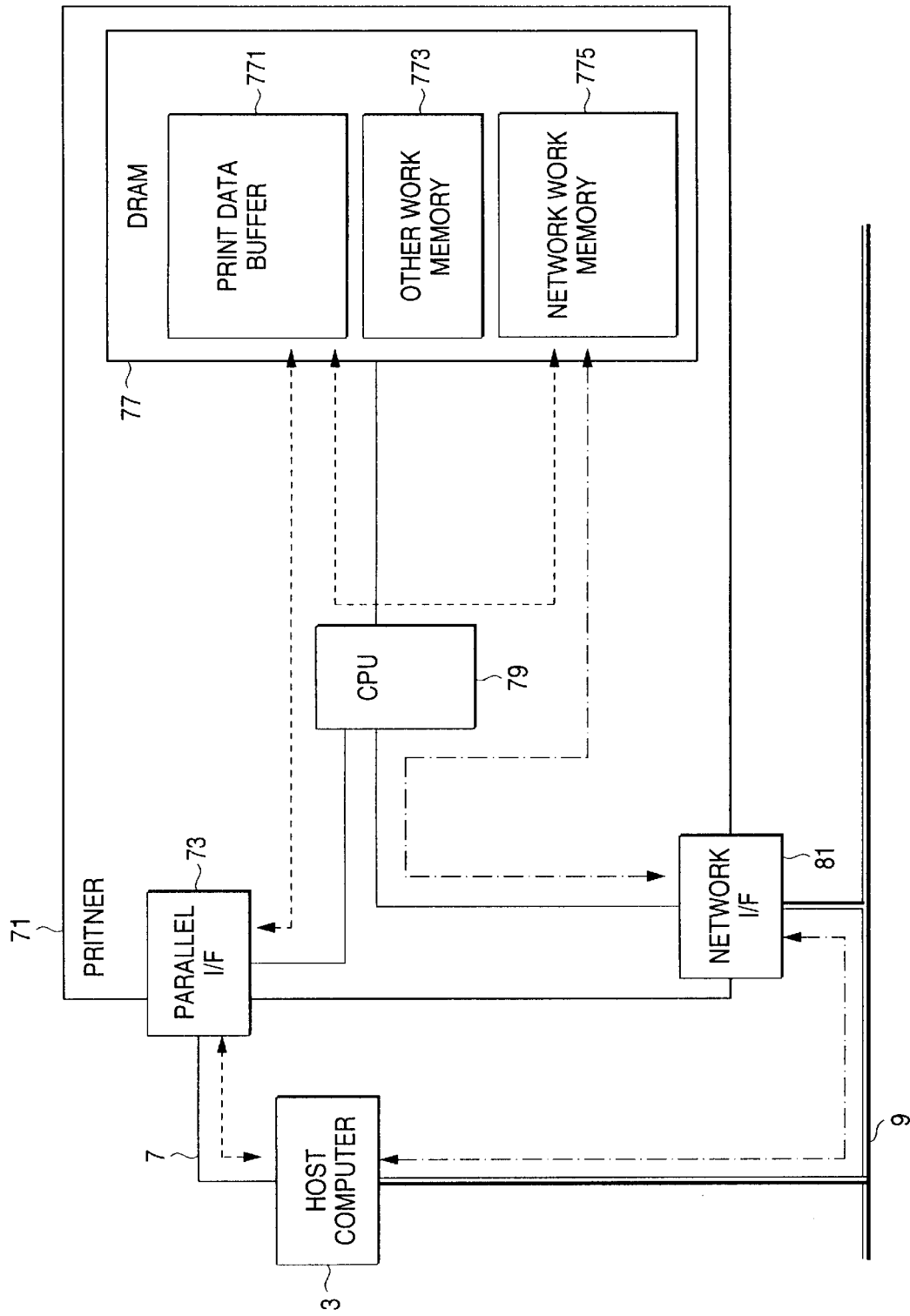
FIG. 5 is a block diagram showing an arrangement of a network printer according to a third embodiment of the present invention.

FIG. 5 shows an arrangement of the network printer according to a third embodiment of the present invention. Also in this figure, chain lines denote flows of the packets, and dashed lines denote flows of the print data.

A network printer 71 shown in FIG. 5 is arranged in a manner that the data received from each of a parallel interface 73 and a network interface 81 is written into a DRAM 77 by means of a CPU 79.

Hereinafter, the operation of the third embodiment at the time of receiving data will be explained.

The operation at the time of receiving the data from the network interface 81 is substantially same as that of the aforesaid first embodiment, and so the explanation thereof will be omitted. Next, the operation at the time of receiving the print job data from the parallel interface 73 is performed in the order of the following processes (1) to (4).

(1) When the parallel interface 73 receives the data of a single unit size (for example, one byte) from the host computer 3, the parallel interface generates an interruption request to the CPU 79.

(2) The CPU 79 reads the received data from the parallel interface 73 and writes the data thus read into a print data buffer 771 of the DRAM 77 (interruption processing).

(3) The aforesaid operations (1) and (2) are repeated until all the received data from the host computer 3 is written into the print data buffer.

(4) Thereafter, the CPU 79 reads the data within the print data buffer 771 and generates the print request on a page unit basis (the language task), and then converts the print request into the raster image (the print task).

According to the aforesaid three embodiments, since the network communication is performed by using the CPU provided in the main body of the printer, it is not necessary to provide a network interface board having its own CPU, so that the network computer cheaper than the related one can be provided.

The aforesaid embodiments are merely examples for explaining the present invention and not intended to limit the present invention only thereto. Accordingly, the present invention can be carried out in various modes other than the aforesaid embodiments. For example, in a view point that the processing for generating the raster image from the print request is executed with the top priority, this processing may not be executed as the task of the CPU but may be executed by a dedicated hardware such as a gate array.

What is claimed is:

1. A network printer connectable to a communication network, comprising:

a central processing unit (CPU);

a random access memory (RAM) utilized by the CPU;

a network interface, coupled to the communication network, for receiving a packet containing print job data from a host device through the communication network;

packet storage means for receiving the packet from the network interface and writing the packet into the RAM; and print image generating means for generating a raster image, wherein the CPU includes:

a communication task for extracting the print job data from the packet within the RAM and writing the extracted print job data into the RAM; and a language task for interpreting the print job data within the RAM, and wherein the print image generating means generates the raster image on a basis of a result of the interpretation of the language task.

2. The network printer as set forth in claim 1, wherein the CPU serves as the packet storage means.

3. The network printer as set forth in claim 1, further comprising:

a direct memory access (DMA) controller serving as the packet storage means.

4. The network printer as set forth in claim 1, wherein the CPU executes the communication task with priority over the language task.

5. The network printer as set forth in claim 1, wherein the CPU includes a print task serving as the print image generating means.

6. The network printer as set forth in claim 5, wherein the CPU prioritize the print task, the communication task and the language task in order, and executes the tasks in accordance with the order of priority.

7. The network printer as set forth in claim 1, further comprising:

a host interface coupled directly to the host device for receiving the print job data from the host device; and a data write means for receiving the print job data from the host interface and writing the print job data into the RAM.

8. The network printer as set forth in claim 7, further comprising:

a DMA controller serving as the data storage means.

9. The network printer as set forth in claim 7, wherein the CPU serves as the data storage means.

* * * * *